March 6, 1962
L. P. FLATLAND
3,023,553
VACUUM-POWERED ASPIRATING LATHE
Filed Sept. 28, 1959
2 Sheets-Sheet 1
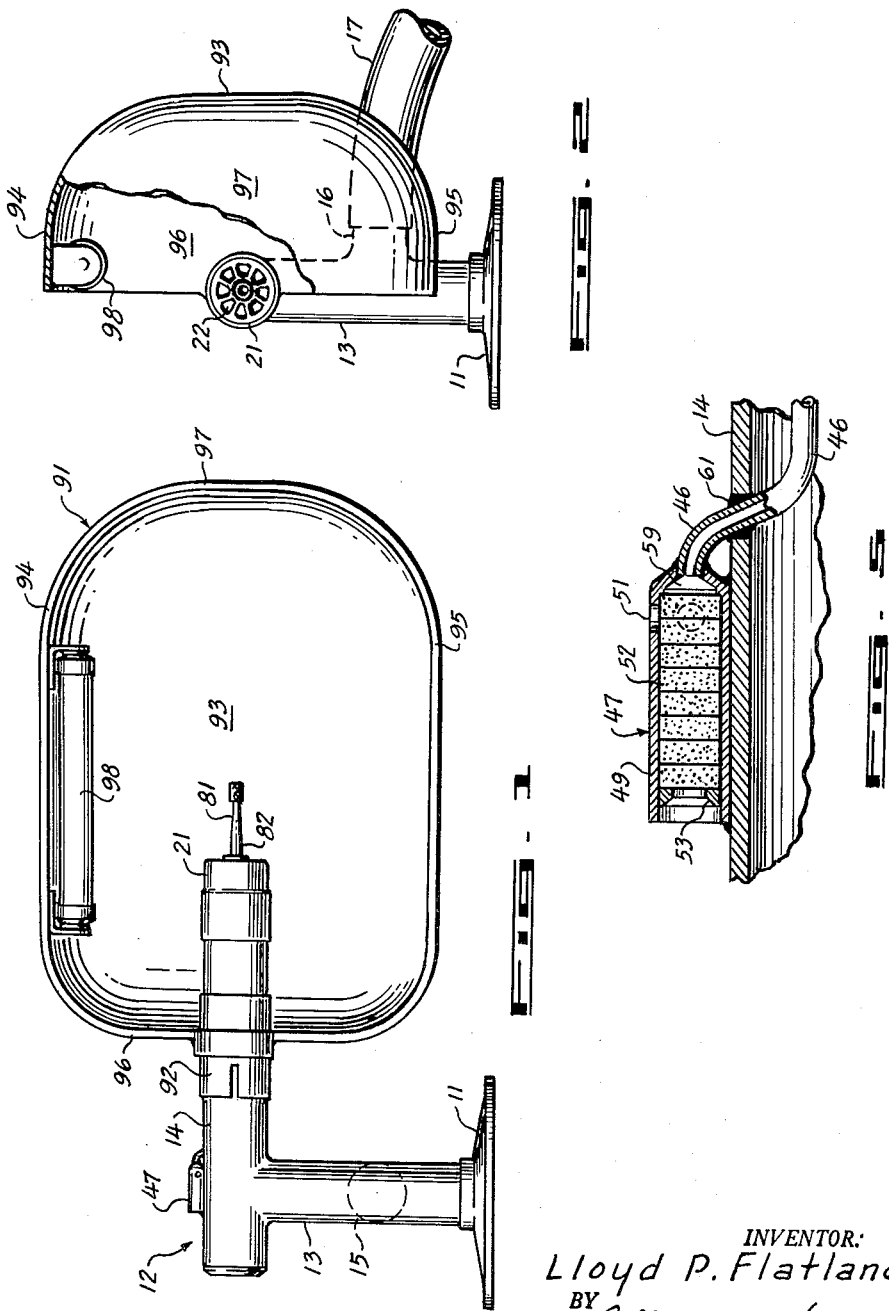
INVENTOR:
Lloyd P. Flatland
BY
Lothrop & West
ATTORNEYS

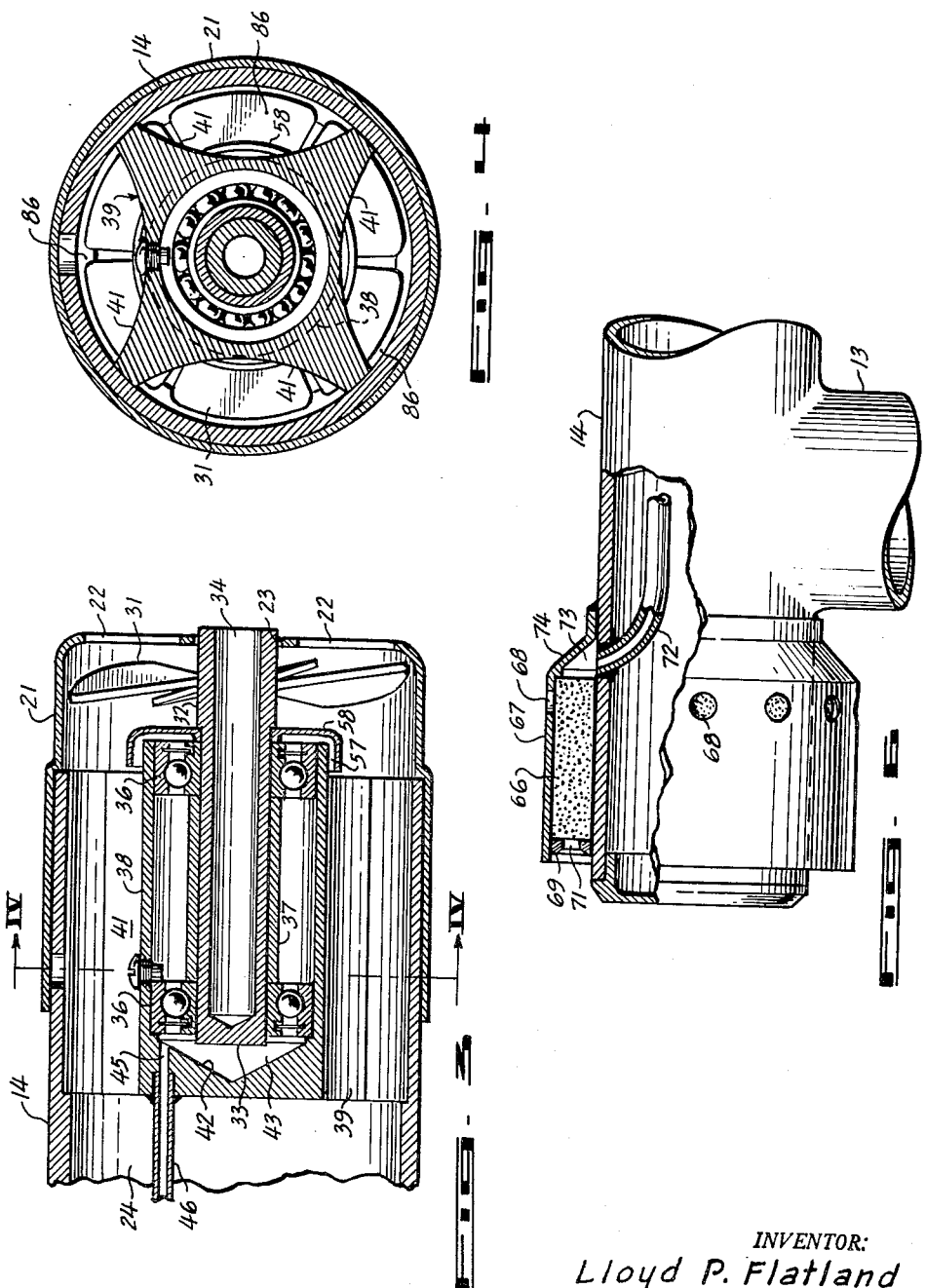

United States Patent Office 3,023,553
Patented Mar. 6, 1962

3,023,553
VACUUM-POWERED ASPIRATING LATHE
Lloyd P. Flatland, 462 Gonzalez Drive,
San Francisco, Calif.
Filed Sept. 28, 1959, Ser. No. 842,776
2 Claims. (Cl. 51—273)

The invention relates to high-speed lathes and, more particularly, to lathes of the varieties utilized, for example, by dentists, dental technicians, jewelers, instrument makers and other craftsmen and artists.

Electric motor-driven lathes of reasonably high speed have been in use for some time. With the continuing improvement in cutting tools, the trend has been toward ever-higher tool speeds, with consequent improvement in operational efficiency. Electric motor drives have, at least to some extent, kept pace with the higher velocities required.

Little, if anything, has been done, however, toward removing from the vicinity of the item being worked on the debris or detritus removed by the cutting operation. It is well known, for example, that in the case of a dental technician working on a plaster mold, or on a casting, a veritable cloud of dust arises from the cutting area, not only obscuring the view but creating an objectionable and even hazardous working condition.

It is therefore an object of the invention to provide a lathe which aspirates from or moves the air away from the vicinity of the cutting tool and which, therefore, quickly removes the debris formed in the cutting operation.

It is another object of the invention to provide a lathe which operates at extremely high speeds and which is therefore highly suitable for use with advanced types of cutting tools and instruments.

It is yet another object of the invention to provide a lathe which is driven by a current of air induced by a vacuum and which, owing to this same current of air, removes air-borne detritus from the cutting area.

It is a further object of the invention to provide a lathe in which the chuck, spindle, or other tool-holding element, is protected from the injurious effects of debris produced by the cutting operation.

It is still a further object of the invention to provide a lathe wherein the moving parts subject to wear are lubricated in a novel and effective manner.

It is still another object of the invention to provide a lathe which is relatively noiseless and vibrationless in operation and which has but few moving parts to get out of order.

It is yet a further object of the invention to provide a lathe which is compact and close-coupled and lends itself to convenience of installation.

It is another object of the invention to provide a generally improved lathe.

Other objects, together with the foregoing, are attained in the embodiments described in the following description and shown in the accompanying drawings in which:

FIGURE 1 is a front elevational view of the device, showing one form of oil reservoir mounted thereon;

FIGURE 2 is an end view of the device, from the right-hand end, as appears in FIGURE 1;

FIGURE 3 is a median longitudinal section, to an enlarged scale, of the spindle and fan portion of the lathe;

FIGURE 4 is a transverse section, the plane of section being indicated by the line 4—4 in FIGURE 3;

FIGURE 5 is a median longitudinal section, to an enlarged scale, of the form of oil reservoir shown in FIGURE 1; and FIGURE 6 is a view, partially in section and to an enlarged scale, of a modified form of oil reservoir and attendant structure.

While the lathe of the invention is susceptible of numerous physical embodiments, depending on the environment and requirements of use, substantial numbers of the herein shown and described embodiment have been made and used and have performed in a most satisfactory manner.

Mounted vertically on a flange 11 adapted to be mounted on a bench or table (not shown) is a hollow, L-shaped member, termed generally a housing and designated by the numeral 12.

The housing 12 includes not only a hollow vertical member 13 but also a hollow horizontal member 14, or arm, or boom. The members 13 and 14 are substantially air-tight except for a lateral opening 15 in the member 13, the opening facing rearwardly (see FIGURE 2) and communicating with a duct 16 and a flexible hose 17 leading to a conventional high-vacuum source or pump (not shown).

The horizontal housing member 14, or hollow boom, extends away from the vertical member 13 and terminates in a cap 21 pressed on the distal end of the boom with an interference fit.

A plurality of sector openings 22 and a circular central opening 23 are provided in the cap, as can be seen most clearly in FIGURES 2 and 3. Consequently, as a vacuum on the order of three inches to ten inches of mercury is applied through the hose 17, a powerful air current is induced adjacent the openings 22, the flow being from the atmosphere inwardly through the openings 22 and through the interior chamber 24 within the housing 14.

Interposed in this air-stream and substantially extending across the circular envelope of the plurality of openings 22 is a fan 31 coaxially disposed on a hub 32 located on the outer end of a hollow spindle 33, the spindle including an axial central chamber 34. The spindle 33 is rotatably mounted in a pair of anti-friction bearings 36 held apart by a tubular spacer 37 and secured within a central sleeve 38, or core, of a spider member 39, the spider including a plurality of spacer arms 41 projecting radially outwardly to engage the inner walls of the housing 14.

The hollow cylindrical spider core 38 is formed with a blind end 42, thereby forming a conical chamber 43 adjacent the inner end of the spindle 33 and the inner one of the pair of bearings 36. The chamber 43 serves as a manifold to distribute substantially equally to all adjacent elements of the near one of the bearings 36 a fine mist of lubricating oil entering through a port 45 communicating with a tubing 46 leading from a lubricating oil reservoir 47 mounted on the outside of the housing 14.

The reservoir 47 comprises a sleeve 49 having adjacent its forward end a plurality of radial apertures 51 exposing the forwardmost pair of a plurality of discs 52, each of the discs comprising a multitude of minute bronze spheres sintered in such a way as to yield a great number of interconnecting passageways, or interstices, and a large amount of total surface area. The discs 52 are held in place by press-fitting in the sleeve 49 an annular ring 53, the ring abutting the discs, as appears most clearly in FIGURE 5. A few drops of oil are inserted from time to time through the opening in the ring 53 and, by capillary action, this oil is quickly absorbed by or disseminated through all of the discs.

As vacuum is applied to the interior of the housing 14, the influence of the vacuum reaches through a channel 57 between a slinger ring 58, mounted on the spindle, and the forward one of the pair of bearings 36. The vacuum's influences also extend through the forward bearing, into the after bearing, into the conical chamber 43 and up the tubing 46 to the forward manifold 59, or chamber, in the oil reservoir 47. The result of this vacuum in the manifold 59, even though the vacuum is considerably attenuated form the vacuum within the housing itself, is to create a small air flow through the radial apertures 51, through the forward pair of discs 52 and into the manifold 59. The oil is in more or less a mist or vapor form at this location and it proceeds forwardly through the tubing 46, which passes through a sealed opening 61 in the housing wall, and into the manifold 43. From the manifold 43, the oil mist moves a labyrinthine fashion through the bearings 36, thereby lubricating the bearings. Any remainder of the mist is slung outwardly through the channel 57 by pumping or fan action of the slinger ring 58 and thus discharges into the air stream rushing past the ring.

A modified form of oil reservoir is illustrated in FIGURE 6, this form enabling a much greater quantity of oil to be stored. Encompassing the left-hand or overhanging end of the housing 14, as the housing appears in FIGURES 1 and 6, is an annular ring 66 formed of the sintered bronze spheres referred to above. Confining the outer periphery of the ring 66 is a cylindrical sleeve 67 provided with a plurality of radial apertures 68 located adjacent the forward end of the sleeve. A locking ring 69 serves to lodge the sintered bronze within the sleeve and an annular passageway 71 in the ring 69 permits oil to be inserted in the sintered bronze member 66.

A vacuum applied to a tubing 72 creates a minute oil flow from the reservoir area adjacent the apertures 68 and the annular manifold 73 formed by the sloping forward end 74 of the sleeve. As oil is withdrawn from this area, oil from farther back in the reservoir moves forwardly, by capillarity, to replace the oil removed by the vacuum.

Cutting is effected by a cutting tool 81, the tool 81 including a cylindrical shank portion 82 adapted to be removably lodged within the spindle chamber 34. The construction and operation of a self-chucking tool highly suitable for use herein forms the subject matter of a patent application filed by me substantially concurrently herewith.

As can be seen most clearly by reference to FIGURES 1 and 3, the application of a vacuum to the interior of the housing 14 effects a powerful inflow of air through the opening 22, driving the fan, and thus the spindle and the cutting tool, at very high speeds, in some instances well in excess of 100,000 r.p.m.

So effective is the cutting ability of advanced cutting points, and burs, for example of the carbide or diamond variety, at these high speeds, that only a "feather" touch is required. As debris is formed during cutting, this debris will in the usual case be powdery or dust-like in form. As this dust becomes air-borne, in the vicinity of the area being cut, it is immediately swept away by the air-current established by reason of the vacuum existing at the grilled opening 22 of the housing. The dust, in other words, is immediately removed and rushed into the housing, past the fan blades and the slinger 58 (which helps to prevent entry of debris into the bearings), through the four longitudinal channels 86 in the spider (see FIGURE 4) and out the hose 17. The hose 17 is ordinarily provided with a vacuum bag (not shown) or other suitable trap or receptable for the cuttings.

While the air currents adjacent the cutting area are in many instances powerful enough to collect a substantial fraction of the debris, it has been found that the use of a hood 91 greatly augments the aspirating ability of the device. Preferably the hood assumes a roughly hemispherical configuration and is mounted on a friction collar 92 encompassing the housing 14 so as to permit rotation as well as translation of the hood. By shifting the hood, an optimum pattern of air flow is achieved and maximum aspiration is effected.

The hood in the form shown in FIGURES 1 and 2 is somewhat elongated, both horizontally and vertically, from a hemisphere and approaches more closely a hollow cylinder partially enclosed at both ends. Thus, the hood includes a back wall 93, a top wall 94, a bottom wall 95, an inner end wall 96 and an outer end wall 97. A suitable lamp 98, located in brackets on the top wall 94, is frequently found to be helpful.

The precise configuration of the hood 91 will depend on the work being handled and in the usual case the hood is located so that the cutting tool 81 is substantially centrally located, as appears in FIGURE 1, with respect to the hood.

While the hood serves as an effective and positive wall or barrier to prevent detritus from moving rearwardly, upwardly and downwardly, its major function is to guide or direct or form the air-flow induced by the vacuum into a predetermined pattern, a pattern which removes in the most effective manner the particular material being worked on. Although the user is sometimes limited by the physical shape and size of the object being cut, the hood, in general, is most satisfactory if its walls are located fairly close to the cutting tool.

With this device, it has been found that the formation of debris clouds of powder and dust is, in the usual situation, entirely prevented by the combination of the hood and the powerful aspirating effect of the vacuum, the vacuum being especially effective owing to its close juxtaposition to the source of the debris.

What is claimed is:

1. A vacuum-powered aspirating lathe comprising an elongated hollow housing of relatively small diameter, said housing having an opening at one end and being in communication at the other end with a vacuum source, an elongated hollow spindle rotatably mounted within said housing and having an open end facing toward said opening in said housing, a fan coaxially disposed on said spindle and extending substantially across said opening whereby the movement of air through said opening through said fan and toward said other end is substantially parallel to the axis of said housing and is effective to rotate said fan and said spindle at speeds of the order of 100,000 r.p.m., a cutting tool detachably mounted in said spindle and being rotatable therewith, said cutting tool being of the hardened variety capable of reaching its optimum efficiency at a rotational velocity of the order of 100,000 r.p.m., a hood at least partially enclosing said cutting tool and said opening whereby air in the vicinity of said cutting tool is directed toward said opening as vacuum is applied to said other end of said housing, a pair of anti-friction bearings mounted in said housing and supporting said spindle, an oil reservoir on the exterior of said housing, and a tubing leading from said reservoir to a location within said housing and adjacent said bearings whereby the vacuum within said housing induces the movement of oil from said reservoir toward said bearings.

2. The device of claim 1 wherein the axial distance between said pairs of bearings is at least one and one-half times the race diameter of said bearings.

References Cited in the file of this patent

UNITED STATES PATENTS

| | | |
|---|---|---|
| 983,988 | Foster | Feb. 14, 1911 |
| 987,820 | Parker | Mar. 28, 1911 |
| 1,147,064 | Wolf | July 20, 1915 |
| 2,078,634 | Karlstrom | Apr. 27, 1937 |
| 2,732,671 | McFadden | Jan. 31, 1956 |
| 2,777,152 | Cosentino | Jan. 15, 1957 |